United States Patent [19]

Murray

[11] 4,362,786

[45] Dec. 7, 1982

[54] APPARATUS AND PRODUCT USEFUL IN MANUFACTURE AND HANDLING OF CABLE SEALS

[75] Inventor: Myles N. Murray, Chargin Falls, Ohio

[73] Assignee: Industrial Electronic Rubber Company, Twinsburg, Ohio

[21] Appl. No.: 238,971

[22] Filed: Feb. 27, 1981

Related U.S. Application Data

[62] Division of Ser. No. 8,914, Feb. 2, 1979, Pat. No. 4,255,479.

[51] Int. Cl.[3] .......................... B32B 9/04; B26F 1/00

[52] U.S. Cl. .................................... 428/36; 29/33 M; 29/33 Q; 29/564.6; 206/347; 425/302.1; 428/542.2

[58] Field of Search ............... 264/163, 292, 297, 319, 264/322, 550, 531, 544, DIG. 65; 29/857, 564.1, 564.6, 292, 429, 33 M, 33 Q, 33 S, 566.2; 425/296, 302.1, DIG. 47; 206/345-347; 83/40, 50; 428/542

[56] References Cited

U.S. PATENT DOCUMENTS

| | | | |
|---|---|---|---|
| Re. 25,313 | 1/1963 | Walker | 29/292 X |
| 2,674,311 | 4/1954 | Griswold | 29/429 |
| 2,958,723 | 11/1960 | Logan et al. | |
| 3,158,669 | 11/1964 | Greenlie et al. | 264/297 X |
| 3,523,474 | 8/1970 | Kinslow, Jr. | |
| 3,659,328 | 5/1972 | Klein | |
| 3,661,251 | 5/1972 | Waeltz | |
| 3,954,923 | 5/1976 | Valyi | 264/163 X |

FOREIGN PATENT DOCUMENTS 1595193 7/1970 France .

*Primary Examiner*—Carl E. Hall
*Assistant Examiner*—Carl J. Arbes
*Attorney, Agent, or Firm*—Maky, Renner, Otto & Boisselle

[57] ABSTRACT

Cable seals of the type employed in sealed electrical connectors are maintained in a predetermined orientation throughout manufacture and handling of same whereby the cable seals may be presented in a usable form to automatic assembly equipment for manufacture in cable lead terminations employed in such connectors. According to the method of the invention, the cable seals are integrally molded in a belt which provides a handleable product with the seals being maintained by the belt in a predetermined orientation. The cable seals then are punched from the belt and simultaneously inserted into a carrier for subsequent handling while still maintaining the cable seals orientated for use such as in automatic assembly equipment.

13 Claims, 12 Drawing Figures

APPARATUS AND PRODUCT USEFUL IN MANUFACTURE AND HANDLING OF CABLE SEALS

This is a division of application Ser. No. 8,914, filed Feb. 2, 1979 and now U.S. Pat. No. 4,225,479, issued Mar. 10, 1981.

FIELD OF THE INVENTION

This invention relates generally to cable seals such as employed in sealed electrical connectors, or like articles, and more particularly to the manufacture and handling of such cable seals or like articles and apparatus therefor.

BACKGROUND OF THE INVENTION

Conventional sealed electrical connectors to which this invention is principally directed usually include mating male and female connector halves having therein one or more sockets adapted to receive, respectively, male and female cable lead terminations. When the connector halves are together, the male and female terminals secured to the cable leads are in mating engagement to form therebetween an electrical connection. It is desirable in such connectors that the electrical connection or connections be sealed from external environmental factors. This is obtained by the cable seals which effectively seal the terminals in their respective connector cavities. Such cable seals normally are secured to the ends of the cable leads by the terminals. A preferred type of cable seal includes plural sealing rings which, when the cable lead termination is received in the socket, engage the socket wall to effect therewith a seal.

Heretofore, the cable seals have been molded by well-known transfer molding techniques. After cure of the cable seals in the transfer mold, the cable seals would be ejected individually from the mold and collected by suitable means in containers for subsequent handling. Because the cable seals more or less would free-fall from the mold after ejection from the mold cavity, the same would be received in the container in a disorientated or random manner for subsequent handling and use. Hence, the cable seals would be delivered at a cable termination assembly site in a jumbled manner for subsequent assembly in the cable lead terminations.

In the manufacture of cable lead terminations, automatic assembly equipment has been employed for stripping the ends of the insulated cable leads and for crimping the terminals to the stripped ends of the cable leads. However, it has been a necessary practice because the cable seals are presented at the assembly site in a disorientated manner to handle manually each individual cable seal between automatic stripping and crimping of the cable leads and terminals, respectively. Prior assembly practices for example included manually orientating the cable seals in a jig and subsequently manually inserting therein the stripped ends of the insulated cable leads. Such assembly practices add significantly to labor costs, are extremely time consuming and laborious for the laborer, and tend to increase the idle time of automatic assembly equipment.

OBJECTS OF THE INVENTION

In view of the foregoing, it is a principal object of the present invention to provide a method of manufacturing and handling cable seals or like articles wherein the cable seals are continually maintained in a predetermined orientation throughout the manufacturing and handling thereof whereby the cable seals may be presented in a usable form to automatic assembly equipment.

Another object of the present invention is to eliminate the manual handling of individual cable seals.

A further object of the present invention is to provide apparatus for carrying out the method of the invention, and products employed in such method.

SUMMARY OF THE INVENTION

As will be appreciated from the description below, this invention principally provides for continually maintaining cable seals in a desirable predetermined orientation throughout manufacturing and handling thereof to facilitate automated assembly of such cable seals in cable terminations.

In accordance with the method of the invention, the cable seals are molded integrally in a belt in a predetermined pattern and orientation. The composite belt (i.e., that including integrally the cable seals) interconnects and orientates the cable seals and provides a handleable product for subsequent operations. Preferably, the belt is elongate and rectangular in shape with the seals arranged therein at precise intervals in at least one or more rows extending along the length of the belt.

Although the composite belt may be adapted for direct use in an assembly unit, preferably the handleable composite belt is positioned in relation to a carrier, such as an inextensible strip, for carrying the cable seals in a plurality of seal receiving openings arranged in a pattern like or different than that of the belt. The cable seals are sheared from the belt and simultaneously inserted into and held in such openings in the carrier strip. The carrier strip provides for subsequent handling of the cable seals while maintaining the same in the predetermined orientation and is adaptable for use in automatic assembly equipment wherein the carrier strip may be continuously and automatically fed for sequential dispensement of the cable seals during assembly of the cable terminations.

In cable seals of the type employing at least one sealing ring or flange, the cable seals are so arranged and sheared from the belt that one of the sealing rings is formed from the belt. Preferably, the cable seals are orientated with their axes extending substantially normal to the planar extent of the belt, and the belt is of a thickness slightly less than that of the sealing ring to be formed. The portion of the belt retained with the seal to form the flange has a boss with the peripheral edge thereof rounded whereby the inner edge of the sealing ring will be rounded after severing of the same from the belt.

The invention also encompasses a punch and die apparatus for shearing the cable seals from the composite belt and simultaneously inserting the same in the carrier strip. Such apparatus includes means for aligning the cable seals in the belt with seal receiving openings in the carrier strip and means for shearing the cable seals from the belt and simultaneously inserting the sheared cable seals into the carrier strip. Preferably, a plurality of cable seals are punched from the belt and inserted into the carrier strip during a single cycle of the apparatus.

A preferred form of the punch and die apparatus comprises a belt backing plate having a surface for supporting the belt and at least one bore opening to the surface adapted to receive therein a cable seal. A reciprocating cutting element is aligned with the bore for passage therethrough and has an end face formed with a cutting edge which cooperates with a cutting edge on the plate to shear the cable seal from the belt as the cutting element is moved into the bore. The cutting element after shearing the seal passes sufficiently into the bore to insert the seal into the carrier strip with the bore serving as a guide for the sheared seal. A suitable guide such as a slit in the plate extending transversely to the bore is provided through which the carrier is guided and sequentially indexed for receipt and transport of the cable seals.

Although the invention principally relates to the method of manufacturing and handling of cable seals for subsequent assembly in cable terminations, the present invention also encompasses the various novel products useful in practicing such method and apparatus useful in carrying out such method, more of which will become apparent from the below detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
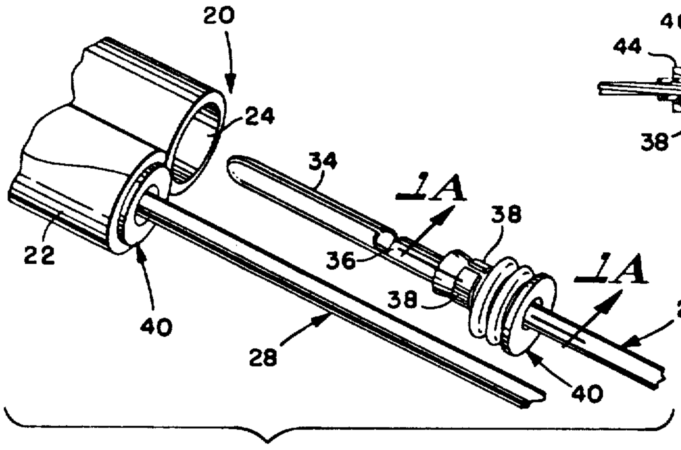
FIG. 1 is a fragmentary perspective view of an electrical connector with one of the cable terminations withdrawn therefrom.

In FIG. 1, reference numeral 20 designates generally the male connector half of an electrical connector assembly which provides for electrical connection of a plurality of conductors or cables. In conventional manner, the male connector half 20 is adapted for mating engagement with a female connector half of the connector assembly to effect the desired electrical connection. The female connector half would be of a construction similar to that of the male connector half 20 differing only in details obvious to one skilled in the art.

Figure 1A:
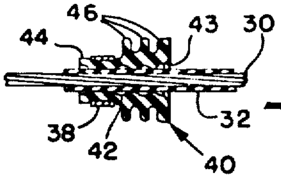
FIG. 1A is a fragmentary section through the cable termination of FIG. 1, taken along the line 1A—1A thereof.

The male connector half is of a conventional form comprising a molded rigid insulating body 22 having a pair of cylindrical sockets 24 opening to the end face thereof, each of which is adapted to receive a cable lead termination designated generally by reference numeral 26. For illustrative purposes, one cable lead termination is shown withdrawn from the body 22 while the other is housed therein in assembled relation. Each cable lead termination 26 is formed at the end of a cable lead 28 which includes wire conductors 30 and insulation sheath 32 as best shown in FIG. 1A. The insulation sheath 32 at the termination end of the cable lead 28 is stripped and a metal terminal 34 is mechanically and electrically secured to the exposed conductors 30 by crimped wire tabs 36 of the terminal 34. The terminal 34 also includes supplemental tabs 38 which are crimped about the insulation sheath 32 adjacent the exposed conductors to secure further the terminal 34 to the cable lead 28.

Each cable lead termination 26 further comprises a cable seal 40 according to the invention which is secured to the cable lead 28 adjacent the stripped end thereof by the crimped supplemental tabs 38 of the terminal 34. Such cable seal 40, although manufactured in accordance with the method of the invention, is similar in configuration to a known type of cable seal presently employed in electrical connector assemblies of the type described, and thus provides the numerous advantages achieved by such known type of cable seal. Each cable seal 40 is generally tubular or sleeve-like in configuration having a concentric internal bore 42 for receipt of the insulated cable lead 28 with a snug and watertight fit. Such bore 42 may be provided with inner annular ridges to facilitate the seal between the cable seal 40 and cable lead 28 and the end of the bore 42 may be tapered outwardly as indicated at 43 to facilitate insertion of the cable lead 28. Each cable seal 40 further comprises a reduced diameter neck portion 44 which, when the cable seal 40 is assembled in the cable lead termination 26, is located adjacent the exposed conductors 30 and gripped by the partially circumscribing supplemental tabs 38 of the terminal 34. At the other end of each cable seal 40 opposite the neck portion 44 are plural, and preferably three, axially spaced, external annular sealing rings or flanges 46. When the cable lead termination 26 is forced or stuffed into the socket 24, the sealing rings 46 function as O-rings under compression and prevent flow of fluids into the interior of the body 22 thereby to shield the electrical connection from external environmental factors which may tend to impair the quality of the electrical transmission through the connector assembly. For proper sealing integrity, each cable seal 40 preferably is made of a rubber-like material, and more preferably, of silicone rubber including an internal bleeding lubricant. Such latter material is resistant to extreme environmental conditions such as extreme temperatures and corrosive substances.

In contradistinction to known methods of manufacturing and handling cable seals for assembly in cable lead terminations such as the type described wherein manual orientating and handling of each cable seal is required, the method according to this invention of manufacturing and handling of cable seals 40 eliminates such manual orientating and handling of each cable seal. The invention provides for efficient and time-saving manufacturing and handling of the cable seals 40 by continually maintaining the same in a predetermined orientation throughout manufacturing and handling thereof whereby the same may be presented in a usable form for automated use in an automatic assembly equipment. To the achievement of these advantages, the method according to the invention generally comprises the steps of molding a plurality of cable seals integrally in a belt, aligning the belt with a carrier having a plurality of seal receiving openings, and shearing the seals from the belt and simultaneously inserting the same into corresponding openings in the carrier. The belt and carrier both maintain the cable seals in a predetermined orientation while providing a readily handleable product. Further in accordance with the method, the cable seals are integrally molded in the belt in such an arrangement that a portion of the belt after shearing the cable seals from the belt forms one of the annular sealing rings of the cable seal. The method of the invention further contemplates automatic indexing of the carrier strip in a termination assembly unit for sequential dispencement of the cable seals carried therein and assembly in the cable lead termination.

GENERAL DESCRIPTION OF THE METHOD

Figure 2:
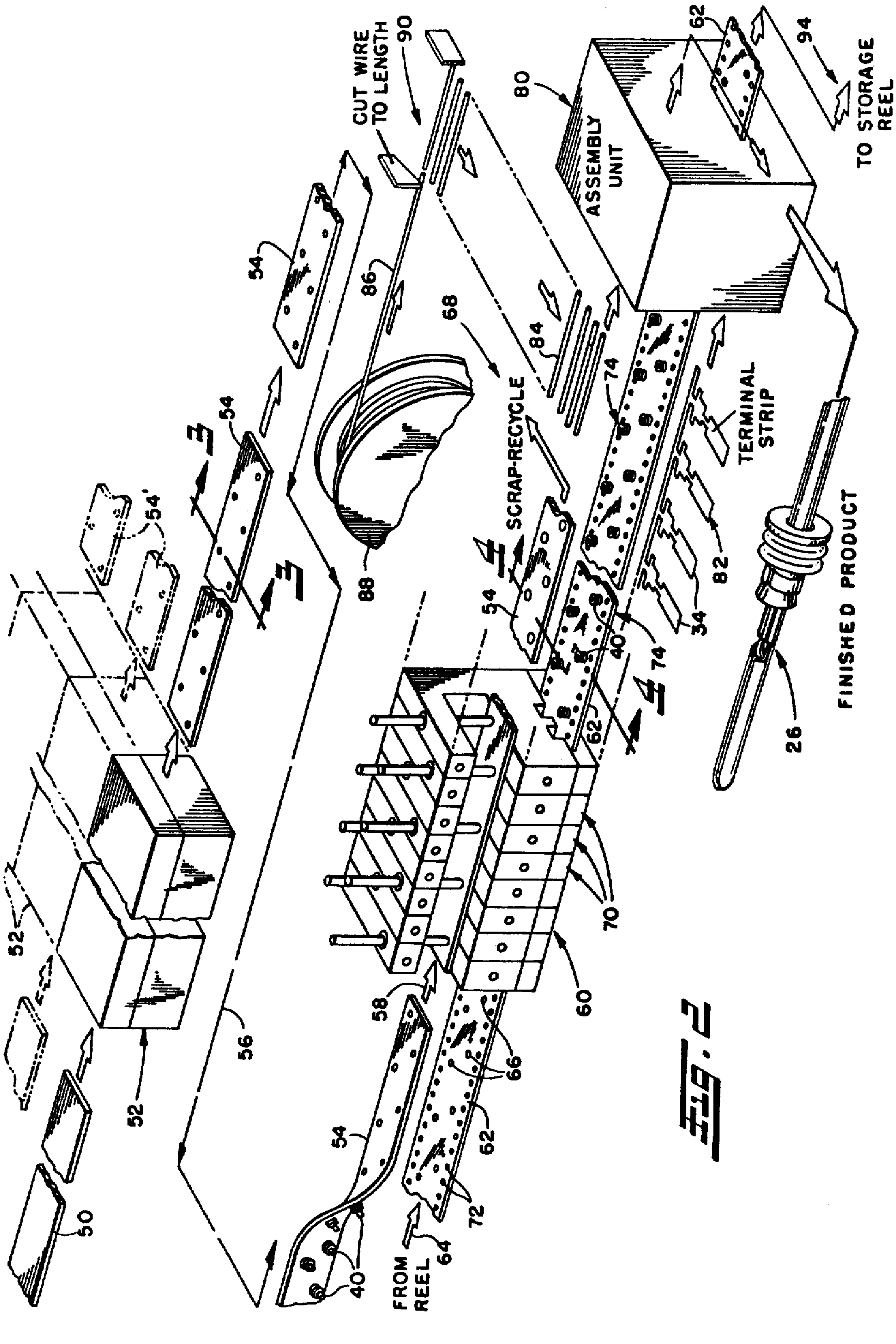
FIG. 2 is a diagrammatic perspective view illustrating the method of the invention and the various products and apparatus employed therein.

The method according to the invention is diagramatically illustrated in FIG. 2. As shown, suitable plastic material 50 from which the cable seals are to be formed is fed into a mold 52 including a mold cavity of a configuration for forming a plurality of cable seals 40 integrally in a belt 54. Preferably, the plastic charging material 50 is in the form of an elongate belt substantially corresponding in transverse dimension to that of the belt 54 but being a predetermined amount thicker to ensure complete filling of the cable seal portions of the mold cavity. After cure, the belt 54 is stripped by suitable means from the mold cavity of the mold 52 drawing with it the integrally formed cable seals 40 protruding from the bottom of the belt as best seen at the left in FIG. 2. It will be appreciated that the belt 54 provides a handleable product for mechanical and/or manual manipulation while maintaining the cable seals 40 in a predetermined orientation. As shown, the cable seals 40 are arranged in the belt 54 in plural longitudinally extending rows with the cable seals 40 of adjacent rows in staggered relation and the cable seals 40 in each row being spaced at precise intervals. The cable seals 40 may also be arranged in only a single row.

Although only one mold 52 need be provided to carry out the method of the invention, a plurality of molds 52' may be ganged to mold a plurality of belts 54' with cable seals integrally formed therein as generally represented in phantom lines in FIG. 2 thereby to achieve multiple handling capacity. Alternatively, a wide belt of many rows of cable seals may be molded in a single mold and the wide belt severed along the length thereof to form a plurality of elongate belts with integral cable seals.

After the integral belt 54 and seals 40 are stripped from the mold 52, the same then are indexed or transported by suitable means as indicated by arrow lines 56 and 58 to a cable seal punch and die apparatus 60 where the cable seals 40 are sheared from the belt 54 and simultaneously inserted into a carrier 62. The carrier 62 preferably comprises an elongate thin strip made of an inextensible material such as mylar which is unwound from a reel and fed to the apparatus 60 in the direction of arrow 64. The carrier strip 62 has spaced along the length thereof at precise intervals a plurality of cable seal receiving openings 66. It is preferred that the arrangement of the openings in the carrier strip 62 correspond to the arrangement of the cable seals 40 in the belt 54 whereby the cable seals 40 can be aligned directly above respective openings 66 in the carrier strip 62. The belt 54 and carrier strip 62 are indexed along parallel paths as shown through the punch and die apparatus 60 for punching of the cable seals 40 from the belt 54 and simultaneous insertion of the same into the carrier strip 62. The scrap belt from which the seals have been removed is identified by reference numeral 66 and may be scrapped or preferably recycled as generally indicated at 68.

As shown, the punch and die apparatus 60 may comprise a plurality of ganged units 70, each of which is adapted to punch a cable seal 40 from the belt 54 and to insert the same into the carrier strip 62. It will be appreciated that the width of each unit is related directly to the spacing between the cable seals in their respective rows. Accordingly, the number of units 70 employed may be varied to accommodate any number of cable seals 40 during a single punch cycle. For example, the punch and die apparatus 60 may be capable of handling the entire length of a belt 54 formed by the mold 52 for simultaneous punching of all the seals therefrom and then subsequent insertion into the carrier strip 62. As usually will be preferred, the carrier strip 62 will be of a substantial length greater than that of the punch and die apparatus 60 and will be sequentially indexed therethrough after each cycle. To facilitate such indexing of the carrier strip, a plurality of perforations 72 are provided along the edge thereof which are adapted to engage the teeth of an indexing sprocket wheel.

With the cable seals 40 retained in the carrier strip 62 as shown at 74, the seals are now presented in a usable and handleable form; for example, the seals are now ready for final assembly in a cable lead termination. The carrier strip, by suitable means, may be fed into and indexed through an assembly unit 80 along with a strip of terminals 82 to be crimped to the stripped end of a cable lead 84. Such cable lead 84 may be provided, for example, by uncoiling cable 86 from a supply coil 88 and cutting the same by suitable means 90 to form cable leads 84 of a desired length. Such sizing of the cable leads may also be done in the assembly unit 80 if desired. The sized cable leads 84 may then be fed by suitable means into the assembly unit 80 where they are stripped, and along with the cable seals 40 and terminals 34, brought into proper relation in a proper sequence for automatic assembly of a cable lead termination 26. The carrier strip 66 after the cable seals 40 have been removed may be coiled on a storage reel to await reuse as generally indicated at 94.

The desirability of orientating the cable seals at precisely spaced intervals should now be appreciated. In known automatic assembly units, the terminals 34 are provided in the terminal strip 82 at spaced intervals and the terminal strip 82 is indexed the length of such interval during each cycle of the assembly unit 80. However, in accordance with this invention and with the cable seals 40 in the carrier strip 62 spaced at like or correspondingly spaced intervals, it is believed that appropriate modifications and alterations can be made to existing automatic assembly units for similarly seqentially indexing the carrier strip 62 to deliver for sequential dispensement the cable seals 40 in proper relation to the cable leads 84 and terminals 34 for automated assembly of the cable termination. For example, such an assembly unit would comprise means for stripping the ends of the cable leads, means for sequentially indexing the carrier strip for presenting a cable seal in relation to the stripped end of the cable lead, means for assembling the cable seal on the stripped end of the cable lead, means for sequentially indexing the terminal strip to bring a terminal in relation to the cable lead and seal assembly, and/or means for securing the terminal, as by crimping, to the cable lead and seal assembly.

The assembly unit 80 may also include means for punching or otherwise severing the cable seals directly from the integral belt 54 with or without employment of an intermediate carrier 62. Although use of the carrier strip 62 is preferred because of its inextensibility which maintains the cable seals at precise intervals during indexing of the carrier strip 62, the belt 54 and integral seals 40 may be similarly indexed and the cable seals 40 punched from the belt and simultaneously, for example, positioned on the cable leads 84. To facilitate indexing thereof, such belt 54 may be molded with perforations along the edges thereof adapted to engage the teeth of an indexing sprocket wheel, and additionally or alternatively, such belt may have secured thereto or molded therein inextensible strips to maintain the precise intervals between adjacent cable seals 40.

THE PRODUCTS

Figure 3:
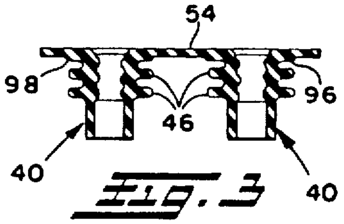
FIG. 3 is a transverse section through the composite belt of FIG. 2, taken along the line 3—3 thereof.

Referring now additionally to FIG. 3 and in accordance with the preferred arrangement, the cable seals 40 are aligned in the rows with their respective axes extending substantially at right angles to the planar extent of the belt 54. Further, the relation between the belt 54 and cable seals 40 is such that the belt 54 forms one of the sealing rings 46 of the cable seal 40. Although the belt 54 may form any one of the sealing rings 46, the belt preferably forms the outermost or end sealing ring. The belt 54 intermediate the seals preferably is slightly less than the thickness of the sealing ring 46 and has formed on its surface facing in the same direction as the remaining sealing rings a boss 96 which provides the desired thickness of the sealing ring 46. The boss 96 is concentric with the cable seal 40 and has a peripheral radial dimension equal that of the sealing ring 46. Preferably, the peripheral edge of the boss is rounded as seen at 98 whereby when the cable seal 40 is sheared from the belt 54, the interior corner of the peripheral edge of the sealing ring will be rounded. In like manner, another boss may be provided on the other surface of the belt 54 to provide a rounded exterior corner of the peripheral edge of the sealing ring.

Figure 4:
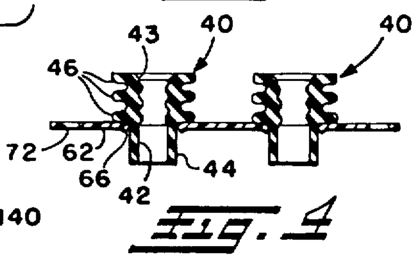
FIG. 4 is a transverse section through the carrier strip with the seals received therein, taken along the line 4—4 of FIG. 2.
Figure 10:
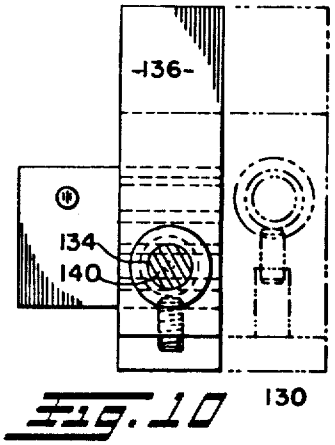
FIG. 10 is a plan view of the apparatus of FIG. 9, as seen from the line 10—10 thereof.
Figure 11:
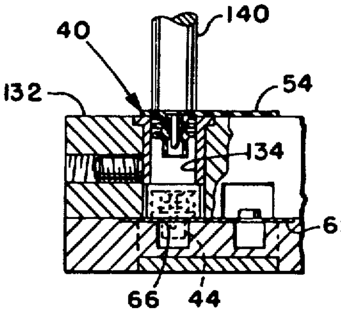
FIG. 11 is a fragmentary section view illustrating the apparatus just prior to punching the seal from a belt and inserting the same into the carrier strip.
Figure 9:
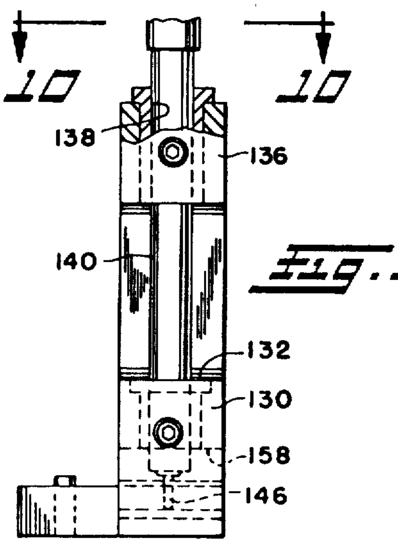
FIG. 9 is an end elevation, partially in section, of the apparatus of FIG. 8, as seen from the line 9—9 thereof.
Figure 8:
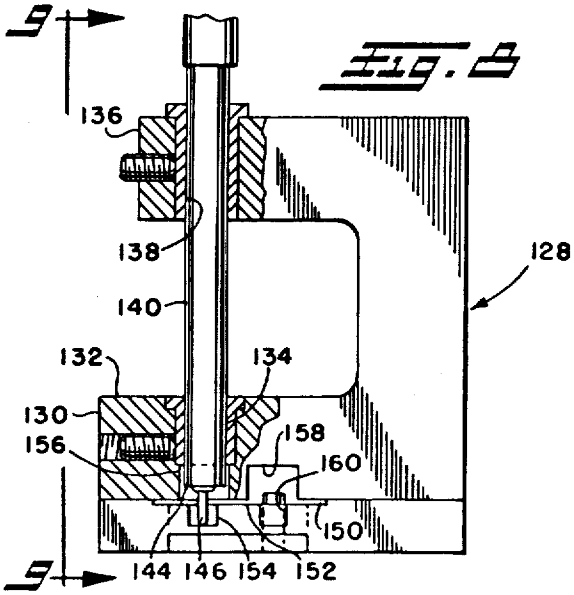
FIG. 8 is an elevation view, partially in section, of the cable seal punch and die apparatus according to the invention.

In FIG. 4, the carrier strip 62 and cable seals 40 can be seen in greater detail. After the cable seal 40 is severed from the belt 54 in the punch and die apparatus 60, the neck portion 44 of the cable seal 40 is pushed into the seal receiving openings 66 provided in the carrier strip 62. To securely hold the cable seals in the carrier strip, the openings 66 are of a diameter slightly less than the outer diameter of the neck portion 44.

THE BELT AND CABLE SEAL MOLD

Figure 5:
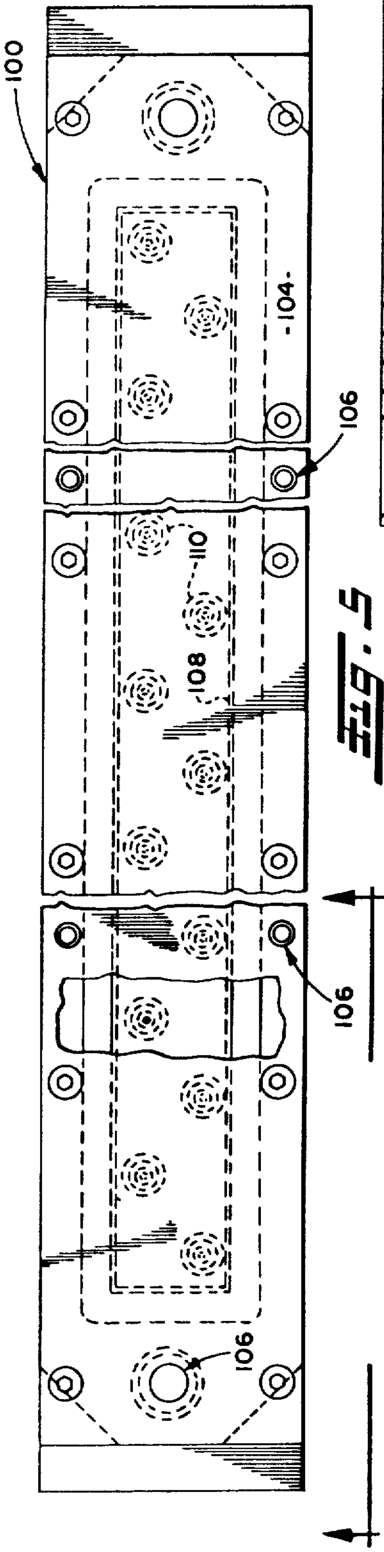
FIG. 5 is a fragmentary plan view, partially broken away, of the belt and cable seal mold according to the invention.
Figure 6:
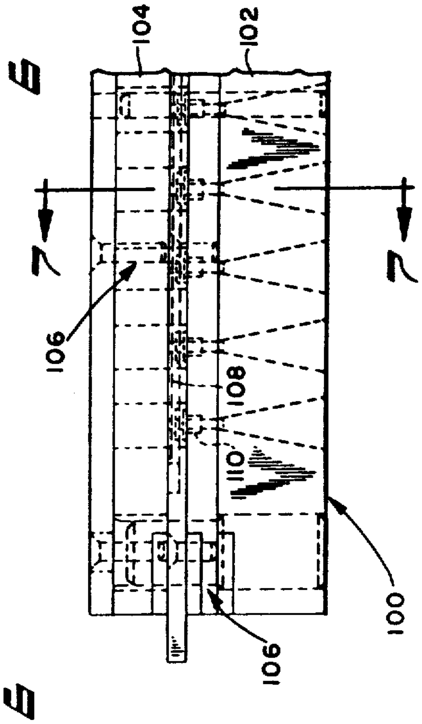
FIG. 6 is a fragmentary elevation view of the mold of FIG. 5, as seen from the line 6—6 thereof.
Figure 7:
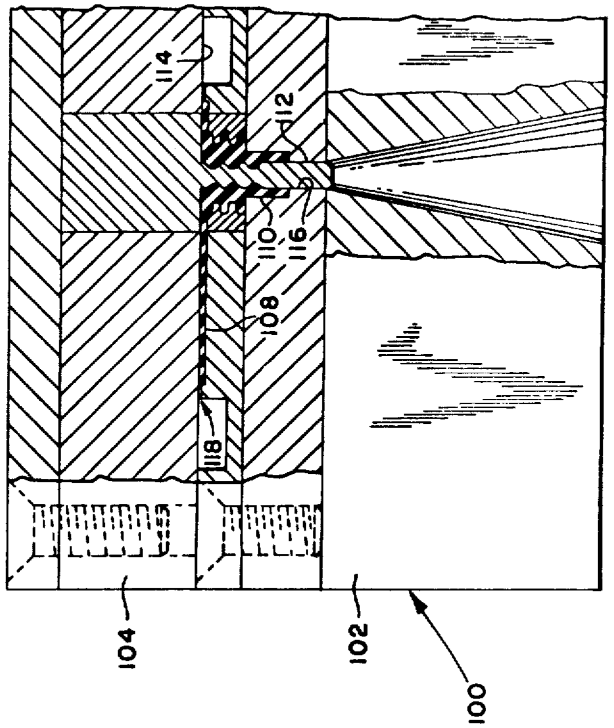
FIG. 7 is a fragmentary end view, partially in section, of the mold of FIG. 6, taken along the line 7—7 thereof.

Referring now to FIGS. 5-7, a preferred belt and cable seal mold 100 according to the invention preferably is of the compression mold type and comprises male and female mold parts. The female or cavity part 102 of the mold is mounted preferably on a lower platen of a hydraulic press (not shown), while the male or plunger part 104 is aligned to match the female part and is attached to an upper platen of the hydraulic press. In conventional manner, suitable means may be provided for heating the mold parts as desired depending, for example, on the materials employed. Pilot pins and pilot bores therefore may also be provided in the mold parts as indicated at 106 to ensure proper alignment of the same.

The female mold part 102 has machined or otherwise formed therein a relatively narrow belt cavity 108 essentially rectangular and elongate in shape, and a plurality of cable seal cavities 110 arranged and orientated relative to the belt cavity thus to define the exterior configuration of the aforedescribed cable seals 40 and integral belt 54. To provide the center bore in the cable seals, a plurality of pins 112 corresponding to respective cable seal cavities 110 project from the face 114 of the male mold part and are receivable in relief bores 116 provided in the female mold part.

As described above, charging material for the mold 100 is preferably initially in the form of a belt corresponding substantially to the dimensions of the belt mold cavity but of a slightly greater thickness to provide for filling by flow of the seal cavities 110. As the mold 100 is closed, the center pin 112 of the male mold part 104 will facilitate filling of the seal cavities 110. It will also be appreciated that gases will be permitted to escape through the slight clearance space between the center pin and pin bore indicated at 116 as well as through the flash indicated at 118. As normally occurs, some material will extrude through the flash 118 or along the center pin; however, no trimming is necessary as such extruded or flash material will be inconsequential because such does not form at any critical sealing portion of the cable seal 40, e.g., at the sealing flanges 46.

CABLE SEAL PUNCH AND DIE UNIT

Referring now to FIGS. 8-11, a preferred form of unit 128 employed in the cable punch and die apparatus 60 comprises a die or belt backing plate 130 having a substantially flat, horizontal surface 132 and a vertical bore 134 which opens to the plate surface 132 and is sized to accommodate with a close fit a cable seal 40 when the integrally formed belt 54 is supported on the plate face. Spaced above the backing plate 130 is a guide arm 136 which, as shown, is integrally formed with the backing plate 130 giving the unit 128 a C-shape configuration. The guide arm 136 has a vertical guide bore 138 in which is mounted for reciprocating movement a cutting element or punch 140. The guide bore 138 is aligned with the vertical bore 134 in the backing plate 130 so that the punch 140 passes into the vertical bore 134 during movement thereof. With a belt 54 supported on the surface 132 with a cable seal 40 received in the vertical bore 134, the end face 144 of the punch 140 forming a square peripheral cutting edge will cooperate with the surface 132 forming a square cutting edge with the vertical bore 134 to shear the cable seal 40 from the belt 54 as the punch 140 is urged by a suitable driving mechanism into the vertical bore 134.

To ensure precise centering of the cable seal 40, a reduced diameter pilot pin 146 extending normal to the punch end face 144 is provided. The diameter of the pilot pin 146 is essentially equal the diameter of the cable seal center bore 42. As the punch 140 begins its downward descent, the pilot pin 146 will first be received in the center bore 42 to effect centering of the cable seal 40 prior to shearing the same from the belt 54. To further ensure precise centering of the cable seal 40, the pilot pin 146 at the end face 144 may have chamfer 148 which engages the tapered end 43 of the cable seal center bore 42 and thereby centers the cable seal relative to the punch and backing plate cutting edges.

The backing plate 130 further has a thin carrier strip guide slot 150 intersecting with the vertical bore 134 at substantially right angles and spaced from the plate surface 132 at least the axial length of a cable seal 40. The guide slot 150 is positioned so that the cable seal receiving opening 66 of a carrier strip 62 guided therein will be in line with the vertical slot 134 for receipt of the punched cable seals 40. As the punch 140 continues its downward descent after shearing the cable seal 40 from the belt 54, it will push the sheared cable seal 40 into the carrier strip 62 with the neck portion 44 of the cable seal 40 projecting into the aligned seal receiving opening 66. To permit sufficient insertion of the cable seal 40 into the carrier strip 62, the lower wall 152 of the carrier strip guide slot 150, which supports the carrier strip as the cable seal is received in the opening 66 thereof, includes a lower channel 154 which accommodates the neck portion 44 of the cable seal which protrudes beneath the carrier strip 62. The width of the lower channel 154 is slightly greater than that of the neck portion 44 and the channel extends along the length of the guide slot 150. The backing plate 130 also includes an upper channel 156 extending oppositely the lower channel 154 relative to the guide slot 150 which is of a width greater than that of the sealing rings 46 of the cable seals. The upper and lower channels permit the cable seals in the carrier strip 62 to be withdrawn transversely through the backing plate 130 along with the carrier strip as the same is indexed through the unit 128. In the event the cable seals 40 are arranged in the belt 54 in staggered rows, additional upper and lower channels, 158 and 160, respectively, will be required to permit passage therethrough of the second row of cable seals received in the carrier strip which are punched from the belt by an adjacent unit such as shown in phantom in FIG. 10.

From the foregoing description, it can now be appreciated that the present invention provides a novel method of manufacturing and handling cable seals wherein the cable seals are continuously maintained in a predetermined orientation throughout manufacturing and handling thereof, products useful therein and apparatus therefor. Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A product useful in automatic cable termination assembly machinery comprising: a flexible carrier strip having a plurality of seal receiving openings spaced along the length thereof, and cable seals inserted in such openings, said cable seals being of tubular configuration and having their axes extending substantially at right angles to the planer extent of said carrier strip.

2. The product of claim 1 wherein said carrier strip comprises means for indexing said strip.

3. The product of claim 2 wherein said means for indexing comprises a plurality of perforations along the edge of said strip.

4. A punch and die apparatus for punching cable seals from an integral belt and for inserting simultaneously the cable seals into a flexible carrier strip, comprising:

alignment means for aligning at least one cable seal in the belt with a seal receiving opening in the flexible carrier strip, and punch means for shearing such one cable seal from the belt and simultaneously inserting the sheared cable seal into such seal receiving opening in the flexible carrier strip.

5. The device of claim 4 wherein a plurality of seals in the belt are aligned with a plurality of seal receiving openings in the flexible carrier strip for simultaneously shearing and inserting such plurality of seals.

6. A device for punching seals from an integral belt and for inserting simultaneously the punched seals into a seal receiving opening in a carrier strip, comprising:

belt backing means having a surface for supporting the belt, at least one bore in said belt backing means opening to said surface adapted to receive a seal therein, and a cutting edge adjacent said bore;

means spaced from said surface for guiding the carrier strip transversely to said bore; and reciprocating punching means aligned with said bore for passage therethrough, said punching means having a cutting edge on its face cooperating with said cutting edge adjacent said bore to shear the seal from the belt as said punching means is moved into said bore, said punching means passing sufficiently into said bore to push the punched seal into the opening in the carrier strip.

7. The device of claim 6 wherein said means for guiding comprises a thin slot in said belt backing means extending substantially normal to the axis of said bore.

8. The device of claim 6 wherein said belt backing means comprises a plurality of said bores arranged in a pattern corresponding to that of the seals in the belt, and said punching means comprises a plurality of punches movable in said bores.

9. The device of claim 6 wherein said end face is flat.

10. The device of claim 7 comprising an enlarged channel extending along said thin slot, said enlarged channel being dimensioned to permit movement of the seal therethrough as the strip is guided through said thin slot.

11. The device of claim 6 comprising means for centering the seal relative to said cutting edges.

12. The device of claim 10 comprising a reduced diameter pilot on said punching means which can fit within the center bore of such seal for centering the same relative to said cutting edges.

13. The device of claim 11 wherein said pilot is chamfered at said end face of said punching means.

* * * * *